United States Patent [19]

Ahamed

[11] 4,316,061

[45] Feb. 16, 1982

[54] MINIMAL DELAY RATE-CHANGE CIRCUITS

[76] Inventor: Syed V. Ahamed, 743 Davis Rd., Gillette, N.J. 07933

[21] Appl. No.: 96,690

[22] Filed: Nov. 23, 1979

[51] Int. Cl.³ .............................................. H04B 1/66
[52] U.S. Cl. ............................. 179/15.55 T; 370/109
[58] Field of Search ................ 179/15.55 T; 370/109, 370/102, 68

[56] References Cited

U.S. PATENT DOCUMENTS

| | | | |
|---|---|---|---|
| 3,213,201 | 10/1965 | Flood | 370/109 |
| 3,781,822 | 12/1973 | Ahamed | 340/172.5 |
| 3,934,094 | 1/1976 | Kobayashi | 179/15.55 T |
| 3,975,763 | 8/1976 | Kitamura | 179/15.55 T |
| 4,210,781 | 7/1980 | Nishimura | 179/15.55 T |

OTHER PUBLICATIONS

*The Bell System Technical Journal,* Dec. 1971, pp. 3177-3194, "A General Class of Rate Change Circuits."

*Primary Examiner*—David L. Stewart

[57] ABSTRACT

Minimal delay rate-change circuits for transmitting data samples partitioned into blocks comprise an arrangement of storage devices (101 through 105) between input (100) and output (600) with individual storage lengths increasing according to a geometric progression; storage means (106) arranged between input and output to store all but one of the remaining samples unallocated to the storage devices; input clocking means (201 through 207) to route input samples to appropriate storage devices or means; and output clocking means (501 through 507) to gate the accumulated samples to the output. The topological arrangement relies on the ability of a storage device to shift out while the next lower size storage device is being loaded.

11 Claims, 8 Drawing Figures

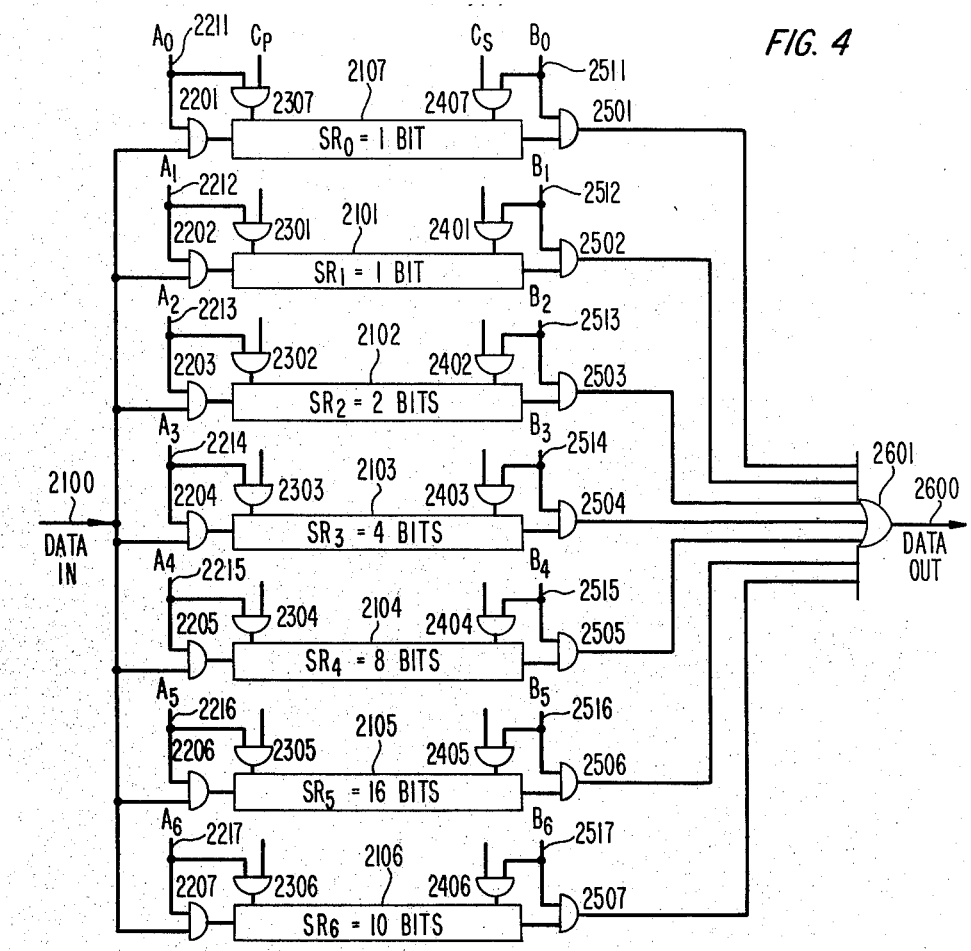

4,316,061

MINIMAL DELAY RATE-CHANGE CIRCUITS

BACKGROUND OF THE INVENTION

1. Field of the Invention

This invention relates generally to rate-change circuits for data transmission and, more particularly, to minimal delay fractional rate-change circuits utilized in time compression multiplex systems.

2. Description of the Prior Art

Rate changing in data transmission applications entails the transformation of data at one rate to data at another predefined rate. Although rate-change circuits are encountered in many data applications, particular attention is focused upon, as exemplary, time compression multiplex (TCM) systems utilizing dispersive channels.

Broadly described, the TCM (also known as burst mode) system comprises cricuitry arranged at each end of the channel for alternately sending bursts of data in multiple-sample blocks. A suitable guard band is associated with each burst to allow for dissipation of transients as well as synchronization and system clock recovery. Buffering in the form of rate-change circuits is required at each channel end to accumulate data for transmission whenever a particular end circuit is operating in the receive mode.

Under the TCM mode of data transmission, the round trip delay time is a critical parameter in controlling a signal interference, known as echo, which originates from effects of channel irregularities on signal propagation. A significant component in this overall delay has been excess delay, that is, the delay in emptying the last buffer are utilized in conventional rate-change circuits which change the rate from the primary (terminal) rate to the secondary (burst) rate and vice versa. Prior to 1971, zero excess delay had not been achieved with conventional arrangements of rate-change circuits, typically shift registers, unless the number of independent shift registers was increased to the number of bits in a block, thus demanding extremely complex arrangements of gating and shifting functions.

The most pertinent prior art regarding rate-change circuits having zero excess delay was set forth by the applicant in a paper entitled "A General Class of Rate-Change Circuits," published in *The Bell System Technical Journal,* December, 1971. The paper presented and discussed a circuit topology useful primarily in magnetic domain technology. The constraint imposed by the technology on the design of such circuits is that all the individual bits of information have to be propagated by one period in one clock cycle. To achieve this design requirement, the patterns of circuit paths are arranged in a geometric progression. The topological arrangement, if implemented with shift registers, would perform satisfactorily to yield zero excess delay. However, the topology imposes two unnecessary restrictions: (i) the capability of shift registers to shift in at one rate and shift out at another rate is not utilized; and (ii) fractional rate change is a 2-step procedure in this topology and therefore requires an excessive number of shift registers.

SUMMARY OF THE INVENTION

These prior art restrictions and limitations are obviated in accordance with the present invention of a first class of rate-change circuits that exhibit zero excess delay while minimizing the number of shift registers and the complexity of shifting and gating functions. For rate increasing circuits, the excess delay is zero whenever the required rate change is more than two. Correspondingly, for rate decreasing circuits, the excess delay is zero for rate changes up to one-half.

In addition, these prior art restrictions and limitations are mitigated in accordance with the present invention of a second class of rate-change circuits that exhibit minimal excess delay as a result of a user-selectable compromise between the number of shift registers and the complexity of shifting and gating functions. For rate increasing circuits, this second class obtains whenever the rate change is between one and two. Correspondingly, for rate decreasing circuits, minimal delay occurs for rate changes between one-half and one.

Broadly speaking, rate increasing circuits in both classes are comprised of a parallel array of shift registers with the individual sizes of the various shift registers increasing geometrically for only a logarithmic increase in the number of shift registers. The base of the logarithm and the geometric multiplier are both determined as the integer part of the ratio of the terminal-to-burst rates. Input clocking means route data samples from the incoming data block to the appropriate shift registers, whereas output clocking means, after appropriate delay, gate the accumulated samples in the shift registers to the output. Moreover, the last bit in the block is either coupled directly to the output or stored in a shift register for a rate change greater than two or between one and two, respectively.

For rate decreasing circuits, the configuration is similar to the above topology. However, an additional input-to-output coupled circuit stores the first bit of the block and the output clocking means begins processing at the beginning of the block. The base/multiplier is the integer part of the burst-to-terminal rate ratio.

For both classes of rate increasing and decreasing circuits, the input and output clocking means utilize signals derivable as combinations of logarithmic counts of either the terminal or burst rates.

Basically, the topological arrangements rely on the ability to shift out from any particular register while the next lower-sized register is shifting in. Two significant advantages arise by these arrangements: (i) the number of shift registers can be reduced exponentially for a given delay; and (ii) the gating can be performed very simply by identical counters that clock out exponentially varying sizes of time at the primary and secondary clock rates.

The organization and operation of this invention will be better understood from a consideration of the detailed description of illustrative embodiments thereof, which follow, when taken in conjunction with the accompanying drawing.

BRIEF DESCRIPTION OF THE DRAWING

FIG. 4 is a schematic diagram depicting an illustrative embodiment in accordance with the present invention of a zero excess delay rate decreasing circuit of base 2 which is the dual to the circuit of FIG. 1;

FIG. 5 presents timing information relating to the input and output clocking means of FIG. 4;

DETAILED DESCRIPTION

For clarity of exposition, it is helpful to separate the presentation of the illustrative embodiments into, firstly, independent coverage of zero delay rate increasing circuits followed by coverage of zero delay rate decreasing circuits and, secondly, discussion of minimal delay rate increasing circuits. Moreover, although emphasis is placed on fractional rate-change circuits, integral rate change is easily accomplished by the circuit arrangements presented herein.

1. Zero Delay Fractional Rate Increasing Circuits

Before elucidating the generalized topology, a particular example is helpful to gain insight into the generalized scheme.

Figure 1:
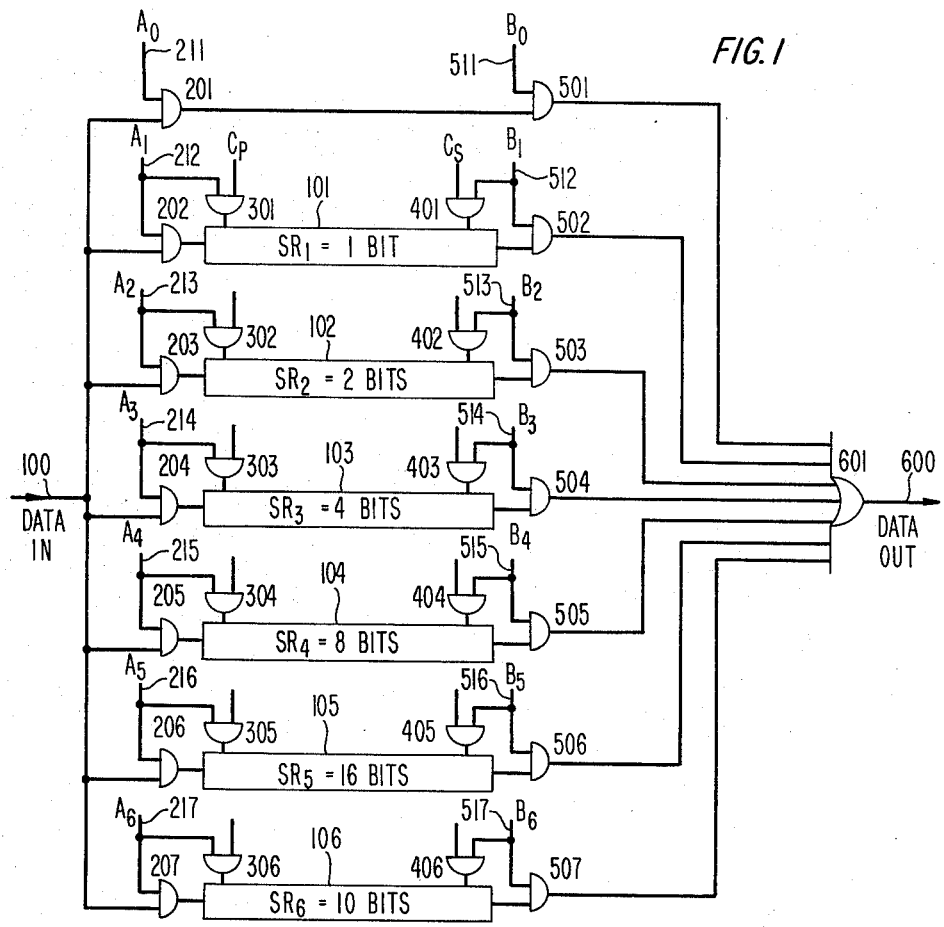
FIG. 1 is a schematic diagram depicting an illustrative embodiment in accordance with the present invention of a zero excess delay rate increasing circuit of base 2.

Consider blocks of data containing 42 sample values, typically bits, to be serially processed in blocks by the TCM end-point circuitry of FIG. 1. The rate-change ratio is 3:7, that is, the output rate is to be $2\frac{1}{3}$ the input rate. Forty-two, being a multiple of 3 and 7, effects a situation wherein blocks of data each 42 bits long undergo processing in 42-bit segments. Each 42-bit block on lead 100 is processed by the same set of gating functions which performed on past blocks. Next, consider the arrangement of six shift registers 101 through 106 shown in FIG. 1. The shift register lengths follow a sequence $2^0$, $2^1$, $2^2$, $2^3$, $2^4$ and $(42\text{-}2^5)$. Thus, shift register 101 is of length 1, shift register 102 is of length 2, and so forth, until last register 106 which is of length 10. The geometric multiplier of 2 is determined as the integer part of the rate-change ratio. The length of the last register 106 is determined as the difference between the number of bits in the data block (42) less the sum of all bits allocated to previous shift registers 101 through 105 plus the bit passed directly between AND gates 201 and 501. In this example, the previous bits to be accounted for total $$1 + \sum_{i=0}^{4} 2^i = 2^5 = 32,$$

so that last register 106 is of length 10.

The signal $C_p$, driving AND gates 301 through 306, and the signal $C_s$, driving AND gates 401 through 406, are input and output clock signals, respectively, occurring at multiples of $T_p$ and $T_s$, where $T_p$ denotes the primary (terminal) clock and $T_s$ denotes the secondary (burst) clock durations in seconds.

The signals $A_0$, $A_1$, ..., $A_6$ on leads 211 through 217 are generated every $42T_p$ seconds and last for $1T_p$, $2^0T_p$, $2^1T_p$, ..., $2^4T_p$ and $(42\text{-}2^5)T_p$ seconds, starting with signal $A_6$ and ending with signal $A_0$. The gating signals $A_0$ through $A_6$ are generated simply by binary counters, whenever the rate-change ratio is between 2 and 3, each counter being driven by clock $C_p$. Similarly, signals $B_0$, $B_1$, ..., $B_6$ appearing on leads 511 through 517 are generated by identical circuits operated at the secondary clock $T_s$ but delayed for the first $(1-3/7)42T_p = 24T_p$ seconds, again starting with signal $B_6$ and ending with $B_0$. Therefore, signals $A_0$ through $A_6$, which form inputs to AND gates 201 through 207, respectively, route the first $(42\text{-}2^5)$ samples to shift register 106, the next $2^4$ samples to shift register 105, and so forth, until the last bit on lead 100 is passed directly to AND gate 501 through AND gate 201. Also, the combination of signals $A_1$ through $A_6$ and $C_p$, forming AND gates 301 through 306, respectively, allows clocking of the data bits into the corresponding shift registers 101 through 106 at the appropriate instants of time. Furthermore, the combination of signals $B_0$ through $B_6$ and $C_s$, forming inputs to AND gates 401 through 406, respectively, sequentially gate the data bits out of the corresponding shift registers 101 through 106 to OR gate 601 at the appropriate instants of time. The TCM data appears on output lead 600 of OR gate 601.

Figure 2:
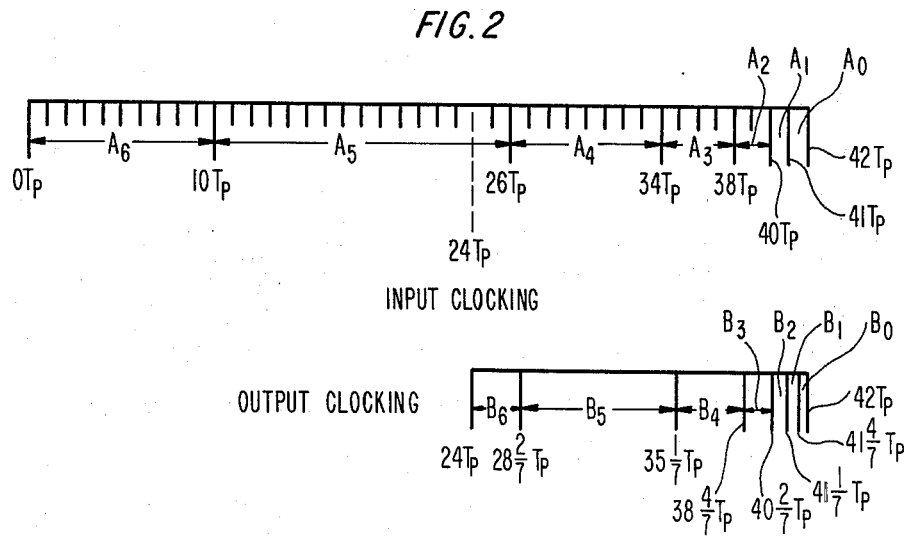
FIG. 2 presents timing information relating to the input and output clocking means of FIG. 1.

The input and output timing information for one 42-sample burst is summarized by the timing diagram of FIG. 2. In FIG. 2, the time increment used for reference is the full-scale value of the primary clock $T_p$ as depicted in the upper timing diagram; this clock processes input data. The secondary clock is scaled relative to the primary clock, as shown in the lower timing diagram; this diagram depicts the instants of occurrence and intervals of transmission of the shifting-out operation. With reference to the upper diagram, the first ten data samples are shifted into register 106 during the interval 0 through $10T_p$. From $11T_p$ through $26T_p$, the next 16 samples are shifted into register 105, and so forth, until the second from last sample is shifted into register 101 during the single time slot ending during the interval ending at $42T_p$. Because of the topological arrangement of registers, the shifting out from a previously loaded register can begin while the next register in the arrangement is being loaded. Moreover, the timing is such that the last bit in the data block is ready to be directly passed through to the output during its arrival since all previous bits have been stored and appropriately gated to the output. To illustrate the output operation, with reference to the lower diagram of FIG. 2, the ten samples stored in register 106 are transferred to the output during the interval from $24T_p$ through $282/7T_p$. During this interval, register 105 has been completely loaded and register 104 has commenced loading. Register 105 empties during the interval from $282/7T_p$ until $351/7T_p$, while register 104 completes loading and register 103 begins processing. The last bit is passed directly to the output as it is arriving during the interval ending at $42T_p$. Since $T_s = 3/7T_p$, it takes an interval $(42-24)T_p = (18)7/3T_s = 42T_s$ seconds to produce the output.

Figure 3:
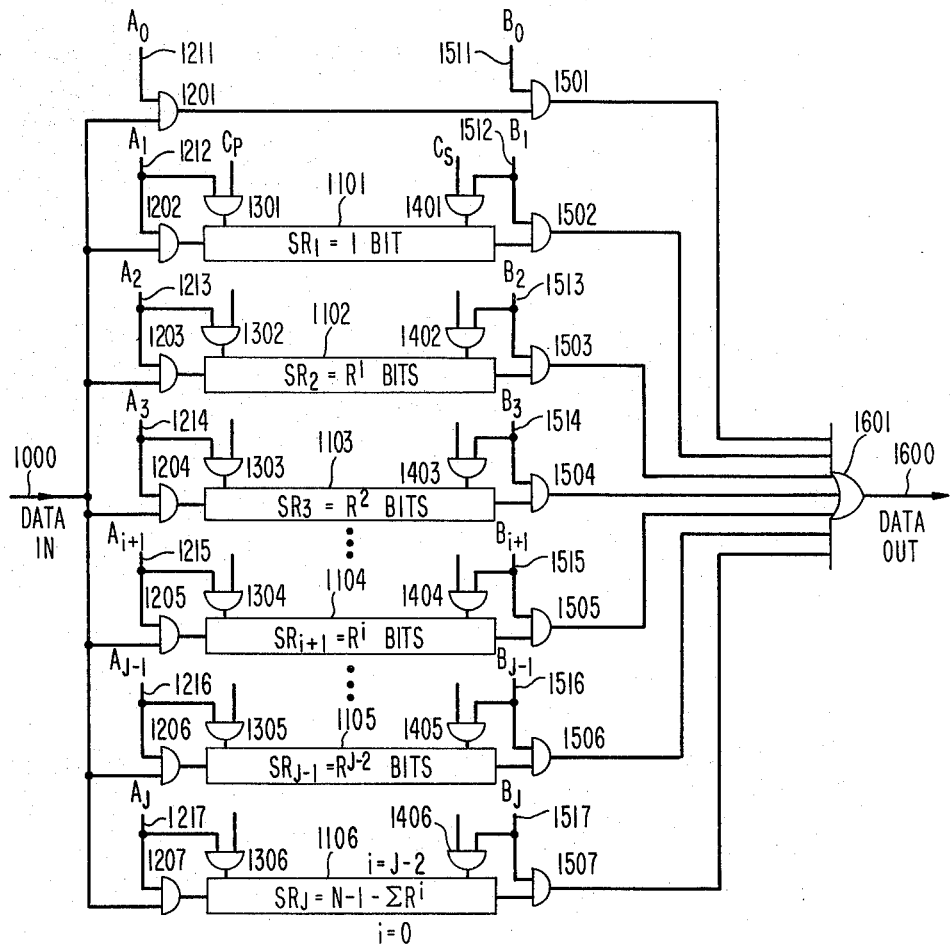
FIG. 3 is a schematic diagram depicting an illustrative embodiment in accordance with the present invention of a zero excess delay rate increasing circuit of base or radix R.

The generalization of the specific embodiment of FIG. 1 is now presented with reference to the circuit topology of FIG. 3. (Elements of FIG. 1 having corresponding elements in FIG. 3 are represented in FIG. 1 by the indicia of FIG. 1 incremented by 1000.) The input data arrives in blocks of N samples on lead 1100 at a rate of $R_p$ blocks per second. These samples are to be processed during a period $T = 1/R_p$ seconds and provided on output lead 1600 at a rate of $R_s(>R_p)$ blocks per second. The rate increasing ratio $R_s:R_p$, being at least 2, determines a radix R as the integer part of the ratio $R_s:R_p$.

The shift register lengths follow a sequence $R^0$, $R^1$, $R^2, \ldots, R^i, \ldots, R^{J-2}$, $$\left( N - 1 - \sum_{i=0}^{J-2} R^i \right).$$

The number of shift registers, J, is chosen to satisfy the condition $R^{J-1} < (N-1)(R-1) \leq R^J$ for all values of $N > R$. This condition obtains since the number of samples accounted for by the previous J−1 registers plus the sample passed directly must be less than N, whereas N must be less than or equal to the sum of all the samples presuming the $J^{th}$ register of of length $R^J$. Thus, $$1 + \sum_{i=0}^{J-2} R^i < N \leq 1 + \sum_{i=0}^{J-1} R^i;$$

since $$\sum_{i=0}^{J-1} R^i = \frac{R^J - 1}{R - 1},$$

the desired condition results. The J shift registers are represented by indicia 1101 through 1106 in FIG. 3.

The signal $C_p$, driving AND gates 1301 through 1306, and the signal $C_s$, driving AND gates 1401 through 1406, are input and output clock signals, respectively, occurring at multiples of $T_p = 1/NR_p$ and of $T_s = 1/NR_s$, where $T_p$ denotes the primary (terminal) clock and $T_s$ denotes the secondary (burst) clock durations in seconds.

The signals $A_0, A_1, \ldots, A_{i+1}, \ldots, A_{J-1}, A_J$ on leas 1211 through 1217 are generated every $T = NT_p$ seconds and last for $1T_p$, $R^0T_p$, $R^1T_p, \ldots, R^{J-2}T_p$ and $$\left( N - 1 - \sum_{i=0}^{J-2} R^i \right) T_p$$

seconds, starting with signal $A_J$ and ending with signal $A_0$. The gating signals $A_0$ through $A_J$ are generated by counters of base R. Similarly, signals $B_0$ through $B_J$ appearing on leads 1511 through 1517 are generated by identical circuits operated by the secondary clock $T_s$ but delayed for the first $(1-R_p/R_s)T$ seconds, again starting with signal $B_J$ and ending with signal $B_0$. Therefore, signals $A_0$ through $A_J$, which form inputs to AND gates 1201 through 1207, respectively, route the first $$\left( N - 1 - \sum_{i=0}^{J-2} R^i \right)$$

samples to shift register 106, the next $R^{J-2}$ samples to shift register 105, and so forth, until the last sample on lead 1100 is passed directly to AND gate 1501 through gate 1201. Also, the combination of signals $A_1$ through $A_J$ and $C_p$, forming inputs to AND gates 1301 through 1306, respectively, allows clocking of the data bits into the corresponding shift registers 1101 through 1106 at the appropriate instants of time. Furthermore, the combination of signals $B_0$ through $B_J$ and $C_s$, forming inputs to AND gates 1401 through 1406, respectively, sequentially gates the data samples out of the corresponding shift registers 1101 through 1106 to OR gate 1601 at the appropriate instants of time. The TCM data appears on output lead 1600 of OR gate 1601.

2. Zero Delay Fractional Rate Decreasing Circuits

When the desired decrease in rate exhibits a rate-change ratio between 0 and 0.5, the basic circuit arrangement already exemplified in FIGS. 1 and 3 can be employed with two minor modifications. The changes that are required include: (i) replacing the direct path that previously transmitted the last sample in the block from input to output with a storage element, say a flip-flop or shift register, to now load and hold the first sample for retransmission; and (ii) reversing the order of generating signals $A_0, A_1, \ldots, A_J$ and $B_0, B_1, \ldots, B_J$, that is, $A_0$ is generated first, followed by $A_1$, and so forth, and similarly with $B_0$ through $B_J$.

As an example, the circuit arrangement of FIG. 4 is the dual of the circuitry of FIG. 1 in that 42-sample blocks are processed with a range decreasing ratio of 7:3, that is, the input ratio is $2\frac{1}{3}$ the output rate. (Elements of FIG. 1 having corresponding elements in FIG. 4 are represented in FIG. 4 by the indicia of FIG. 1 incremented by 2000.)

Shift register 2107 has been added to load and hold the first bit from the block arriving on lead 2100. Once again, the sizes of shift registers 2101 through 2106 can be written down as $2^0, 2^1, \ldots, (42-2^5)$. The clocks $C_p$ and $C_s$, forming inputs to AND gates 2301 through 2307 and 2401 through 2407, respectively, are in the proportion 3:7. The signals $A_0$ through $A_6$ on leads 2211 through 2217 and $B_0$ through $B_6$ on leads 2511 through 2517, respectively, are generated for $(1, 2^0, 2^1, \ldots, 2^4, 10)T_p$ and $(1, 2^0, 2^1, \ldots, 2^4, 10)T_s$ seconds starting at the beginning of the block. The starting instants of these signals are $(0, 1, 2^0, 2^1, \ldots, 2^4)T_p$ seconds and $(0, 1, 2^0, 2^1, \ldots, 2^4)T_s$ seconds from the starting position of the block for $A_0$ through $A_7$ and $B_0$ through $B_7$, respectively. Timing information is summarized by the diagram depicted in FIG. 5. The reference interval is the burst clock $T_s$ and the output clocking is shown to this scale in the lower diagram. The input clocking is scaled relative to $T_s$ and the input shifting and gating intervals are depicted in the upper diagram.

The principle of this example may be extended to an N-bit block of radix R and a circuit configuration similar to that of FIG. 3, with the minor modifications described above, obtains.

3. Fractional Rate Increases Between One and Two

A zero excess delay circuit configuration for these rate changes may also be derived by extending the previously described principles. However, the number of shift registers increases to the number of bits in the block, as in conventional rate-change circuits. It is possible, though, to compromise the zero delay requirement slightly and obtain the advantages of reducing the number of shift registers and simplifying the gating and shifting functions. These considerations give rise to a second class of rate-change circuits, the so-called minimal delay circuits, which are now discussed.

Figure 6:
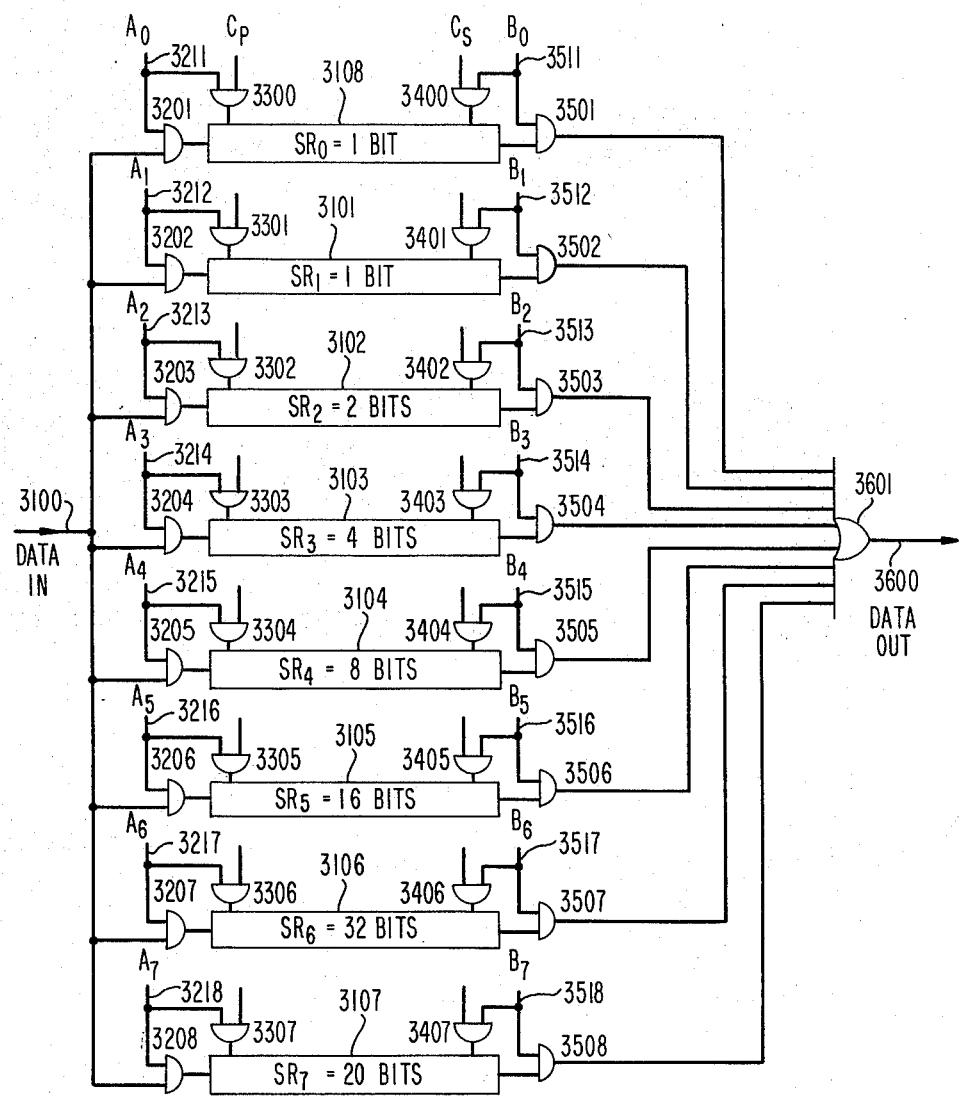
FIG. 6 is a schematic diagram depicting an illustrative embodiment in accordance with the present invention of a minimal excess delay rate increasing circuit of base 2 which obtains for rate ratios between one and two.

Again, for insight, consider the specific example of a data block 84 bits long to be processed by the circuitry of FIG. 6. The desired ratio increase is 4:7, that is, the output rate is $1\frac{3}{4}$ of the input rate. For rate-change ratios between 1 and 2, the radix is preselected to be 2. Thus, the arrangement of FIG. 6 is consistent with the arrangement of FIG. 1, which is also of radix 2. (Elements of FIG. 1 having corresponding elements in FIG. 6 are represented in FIG. 6 by the indicia of FIG. 1 incremented by 3000.)

However, if shift register 3107 is emptied after a delay of $(1-4/7)84T_p=36T_p$, then the next lower shift register 3106 will not be completed loaded; it is for this reason that the compromise becomes necessary. If the shifting-out sequence to output 3600 is delayed by a minimal amount to just accommodate the loading requirement of register 1306, then the incremental delay is given by $44/7\ T_p=20T_p+32T_p-36T_p-20(4/7)T_p$.

Figure 7:
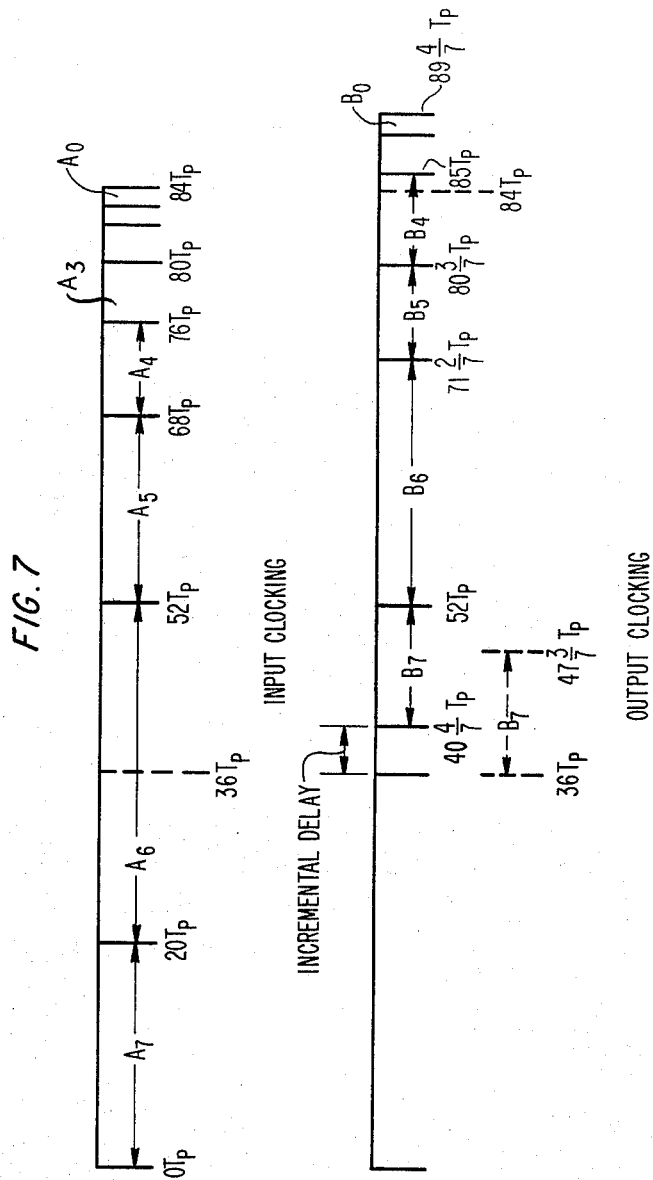
FIG. 7 presents timing information relating to the input and output clocking means of FIG. 6 and depicting the interval of minimal delay.

The more fully understand this delay factor, reference is made to the timing diagram of FIG. 7. This diagram is similar in construction to the above-described FIG. 2. The reference time period is $T_p$ and the output timing sequence, shown in the lower chart of FIG. 7, is scale relative to the input sequence of the top chart.

If shift register 3107 began shifting out at $36T_p$, the shift operation would be completed at $473/7T_p$ (see dashed interval below the second chart). But, shift register 3106 is still being loaded and will be fully loaded at $52T_p$. It is only from $52T_p$ on that shift register 3106 can be gated to the output. The preferred solution to this problem is to delay the shifting out of register 3107 for $44/7T_p$ seconds so that the final shift out from register 3107 and the final loading of register 3106 coincide.

The minimum delay of $44/7T_p$ seconds plays a central role in the operation of the circuit. This delay, being essential for the appropriate functioning of shift register 3106, gets fragmented into $22/7T_p$, $11/7T_p$, $4/7T_p$, $2/7T_p$, $1/7T_p$ and finally $1/7T_p$ for the shift registers 3105 down to 3101 and 3108, respectively. Once this $44/7T_p$ delay is generated by additional circuitry, the functioning of AND gates 3201 through 3208, 3300 through 3307, 3400 through 3407 and 3501 through 3508 and signals $A_0$ through $A_7$ and $B_0$ through $B_7$ can be accomplished through normal binary counters, delayed the appropriate amount. This feature eliminates the need for complicated gating circuits even when the fractional increasing rate is less than 2.

It can be seen that the entire delay of $44/7T_p$ seconds can be cut in half by partitioning register 3106 into two 16-bit registers (not shown). In this case, register 3107 is delayed by $22/7T_p$ and the remaining delay is partitioned into $11/7T_p$, $4/7T_p$, $2/7T_p$, $1/7T_p$ and $1/7T_p$ for the remaining shift registers 3104 down to 3101 and 3108.

Extending this reasoning indefinitely would require all shift registers to be partitioned into single bit registers for zero delay. It is at this stage that the compromise between shift register complexity and minimal delay becomes obvious. For example, conventional circuit arrangements of 7 shift registers each 12 bits long would yield a delay of $12T_p$ seconds whereas 12 shift registers each 7 bits long would yield a delay of $7T_p$ seconds. This compares to a delay of $44/7T_p$ and $22/7T_p$ seconds for eight and nine shift registers, respectively, for the topology exemplified by FIG. 6. The circuit complexity is selectable by the designer depending on particular requirements.

Figure 8:
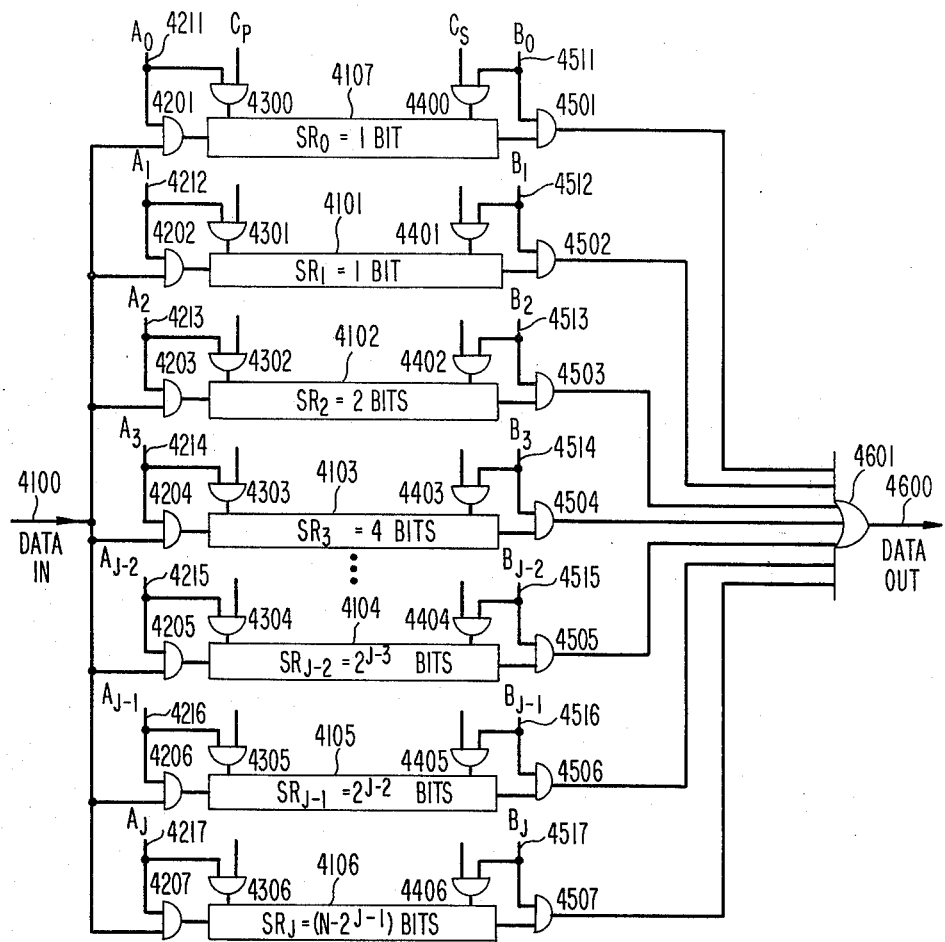
FIG. 8 is a schematic diagram depicting a generalized illustrative embodiment in accordance with the present invention of a minimal excess delay rate increasing circuit for rates between one and two.

The generalization of the specific embodiment of FIG. 6 is shown by the circuit topology of FIG. 8. (Elements of FIG. 1 having corresponding elements in FIG. 8 are represented in FIG. 8 by the indicia of FIG. 1 incremented by 4000.) The input data arrives in blocks of N samples on lead 4100 at a rate $R_p$ blocks per second. These samples are to be processed during a period $T=1/R_p$ seconds and provided on output lead 4600 at a rate of $R_s(>R_p)$ blocks per second. The rate increasing ratio $r=R_s/R_p$ is between one and two.

The shift register lengths follow a sequence $1, 2^0, 2^1, 2^2, \ldots, 2^{J-3}, 2^{J-2}, (N-2^{J-1})$. The number J is chosen to satisfy the condition $1+2^{J-1}<N\leq 1+2^J$.

The delay requirement is determined as follows. To assure that the shift out of register 4106 can take place immediately after the shifting in of register 4105, the delay necessary is calculated from $$D=\left[(N-2^{J-1})+2^{J-2}-N\left(\frac{R-1}{r}\right)-\left(\frac{N-2^{J-1}}{r}\right)\right]T_p \text{ seconds}$$

or $$D=2^{J-2}\left(\frac{2}{r}-1\right)T_p \text{ seconds.}$$

In the first expression above, the first two terms denote the time required to fill last registers 4107 and 4106 with $(N-2^{J-1})$ and $2^{J-2}$ shift register positions at the primary rate of T seconds per block. The third term denotes the start of the secondary block due to a difference of clock rates between $C_p$ and $C_s$. The fourth term represents the time to empty register 3107 at the secondary rate. As anticipated, in the limiting case as $r\rightarrow 2$, the delay necessary tends to zero.

It is to be further understood that the delay circuitry, and associated methodology, described herein is not limited to specific forms disclosed by way of example and illustration, but may assume other embodiments limited only by the scope of the appended claims.

I claim:

1. Circuitry for transforming an input signal partitioned into blocks of samples to a rate-changed output signal

CHARACTERIZED BY means for sequentially storing a plurality of said samples in locations arranged in parallel between said input and said output and having lengths proportional to a geometric progression, and means for sequentially gating the contents of said locations during predetermined time intervals to said output.

2. Circuitry as recited in claim 1 wherein said means for storing includes storage means having a length determined by all but one of the remaining ones of said samples unallocated by said geometric progression.

3. Circuitry for transforming an input signal partitioned into blocks of samples to a zero delay, rate increased output signal having a rate ratio of at least two, said circuitry

CHARACTERIZED BY means for sequentially storing a plurality of said samples in locations arranged in parallel between said input and said output and having lengths proportional to a geometric progression, storage means having a length determined by all but one of the remaining ones of said samples unallocated by said geometric progression, said means for storing including means for routing all but the last of said samples to, first, said storage means and second, said means for storing starting with the maximum of said lengths, and means for sequentially gating the contents of said locations during predetermined time intervals to said output, said means for gating comprising means for serially generating said time intervals in proportion to, first, said storage means length and, second, said lengths of said means for storing starting with the maximum;

means for delaying the operation of said means for gating for a duration predetermined by said ratio; and means for transmitting the last of said samples to said output upon reception at said input.

4. Circuitry for transforming an input signal partitioned into blocks of samples to a zero delay, rate decreased output signal having a rate ratio of at most one-half, said circuitry

CHARACTERIZED BY means for sequentially storing a plurality of said samples in locations arranged parallel between said input and said output and having lengths proportional to a geometric progression, storage means having a length determined by all but one of the remaining ones of said samples unallocated by said geometric progression, said means for storing including: means for routing all but the first of said samples to, first, said means for storing starting with the maximum of said lengths and, second, said storage means; and means for holding said first of said samples, and means for sequentially gating the contents of said locations during predetermined time intervals to said output, said means for gating comprising means for serially generating said time intervals in proportion to: first, one of said samples; second, the lengths of said means for storing starting with the minimum; and, third, said storage means length.

5. Circuitry for transforming an input signal partitioned into blocks of samples to a minimal delay, rate increased output signal having a rate ratio between one and two, said circuitry

CHARACTERIZED BY means for sequentially storing a plurality of said samples in locations arranged in parallel between said input and said output and having lengths proportional to a geometric progression, storage means having a length determined by all but one of the remaining ones of said samples unallocated by said geometric progression, said means for storing including: means for routing all but the last of said samples to, first, said means for storing starting with the maximum of said lengths and, second, said storage means; and means for holding said last of said samples, and means for sequentially gating the contents of said locations during predetermined time intervals to said output, said means for gating comprising means for serially generating said time intervals in proportion to: first, said storage means length; second, said lengths of said means for storing starting with the maximum; and, third, one of said samples; and means for delaying the operation of said means for gating for a duration predetermined by both said ratio and the maximum of said lengths.

6. In a time compression multiplex system processing data in blocks of length N during a period T, a zero delay fractional rate increasing circuit having a block input rate $R_p = 1/T$ and output rate $R_s$ wherein N is a multiple of $R_p$ and $R_s$ and the ratio $R_s:R_p$, being at least 2, determines a radix R as the integer part of the ratio $R_s:R_p$, said circuit

CHARACTERIZED BY a plurality of shift registers arranged in parallel between the input and output of said circuit, the number J of said shift registers satisfying the condition $R^{J-1} < (N-1)(R-1) \leq R^J$, and the lengths of said shift registers following the progression $R^0, R^1, R^2, \ldots, R^i, \ldots,$ $$\left(N - 1 - \sum_{i=0}^{J-2} R^i\right)$$

from the first to the last of said shift registers;

input clocking means driven at said rate $R_p$, initialized and activated at the beginning of each said period T, for routing samples from said input to said shift registers in proportion to said shift register lengths starting with said last and ending with said first of said shift registers;

output clocking means, driven at said rate $R_s$, for sequentially gating the samples stored in said shift registers to said output, said output clocking means activated during each said period T after a delay interval of $(1 - R_p/R_s)T$; and means for routing the last sample in said block to said output.

7. In a time compression multiplex system processing data in blocks of length N during a period T, a zero delay fractional rate decreasing circuit having a block input rate $R_p$ and output rate $R_s = 1/T$ wherein N is a multiple of $R_p$ and $R_s$ and the ratio $R_p:R_s$, being at least 2, determines a radix R as the integer part of the ratio $R_p:R_s$, said circuit

CHARACTERIZED BY a plurality of shift registers arranged in parallel between the input and output of said circuit, the number $(J+1)$ of said shift registers satisfying the condition $R^{J-1} < (N-1)(R-1) \leq R^J$, and the lengths of said shift registers following the progression $1, R^0, R^1, R^2, \ldots, R^i, \ldots,$ $$\left(N - 1 - \sum_{i=0}^{J-2} R^i\right)$$

from the first to the last of said shift registers;

input clocking means, driven at said rate $R_p$, initialized and activated at the beginning of each said period T, for routing samples from said input to said shift registers in proportion to said shift register lengths starting with said first and ending with said last of said shift registers; and output clocking means, driven at said rate $R_s$, for sequentially gating the samples stored in said shift registers to said output, said output clocking means initialized and activated at the beginning of each said period T.

8. In a time compression multiplex system processing data in blocks of length N during a period T, a minimal delay fractional rate increasing circuit having a block input rate $R_p = 1/T$ and output rate $R_s$ wherein N is a multiple of $R_p$ and $R_s$ and the ratio $R_s:R_p$ is between 1 and 2, said circuit

CHARACTERIZED BY a plurality of shift registers arranged in parallel between the input and output of said circuit, the number (J+1) of said shift registers satisfying the condition $2^{J-1} < N-1 \leq 2^J$, and the lengths of said shift registers following the progression $1, 2^0, 2^1, 2^2, \ldots, 2^i, \ldots, (N-2^{J-1})$ from the first to the last of said shift registers:

input clocking means driven at said rate $R_p$, initialized and activated at the beginning of each said period T, for routing samples from said input to said shift registers in proportion to said shift register lengths starting with said last and ending with said first of said shift registers; and output clocking means, driven at said rate $R_s$, for sequentially gating the samples stored in said shift registers to said output, said output clocking means activated during each period T after a delay interval of $(1+R_p/R_s)T + 2^{J-2}(2R_p/R_s - 1)T$.

9. A method for transforming an input signal partitioned into sample blocks to a rate-changed output signal comprising the steps of:

sequentially storing a plurality of said samples in locations arranged in parallel between said input and said output and having lengths proportional to a geometric progression; and sequentially gating the stored samples from said locations to form at least a portion of said output signal.

10. A method for transforming an input signal partitioned into sample blocks to a rate-changed output signal comprising the steps of:

sequentially storing a plurality of said samples in locations having lengths proportional to a geometric progression;

storing all but one of the remaining ones of said samples unallocated by said geometric progression; and sequentially gating the stored samples from said locations to form at least a portion of said output signal.

11. A digital rate-change circuit

CHARACTERIZED BY a plurality of sample storage means arranged in parallel and having geometrically increasing numbers of sample positions, and means for gating sample data into and out of said storage means at different rates.

* * * * *

UNITED STATES PATENT AND TRADEMARK OFFICE
CERTIFICATE OF CORRECTION

PATENT NO. : 4,316,061

DATED : February 16, 1982

INVENTOR(S) : Syed V. Ahamed

It is certified that error appears in the above-identified patent and that said Letters Patent is hereby corrected as shown below:

The name of Assignee, Bell Telephone Laboratories, Incorporated, was omitted from title page of patent. Column 1, line 34, "are" should read --area--. Column 4, line 51, "282/7$T_p$" should read --28$\frac{2}{7}T_p$--; line 54, "282/7$T_p$" should read --28$\frac{2}{7}T_p$--; line 54, "351/7$T_p$" should read --35$\frac{1}{7}T_p$--. Column 5, line 37, "leas" should read --leads--. Column 6, line 22, "ratio" should read --rate--; line 66, "ratio" should read --rate--. Column 7, line 13, "44/7$T_p$" should read --4$\frac{4}{7}T_p$--; line 14, "The" should read --To--; line 22, "473/7$T_p$" should read --47$\frac{3}{7}T_p$--; line 28, "44/7$T_p$" should read --4$\frac{4}{7}T_p$--; line 30, "44/7$T_p$" should read --4$\frac{4}{7}T_p$--; line 33, "22/7$T_p$" should read --2$\frac{2}{7}T_p$--; line 33, "11/7$T_p$" should read --1$\frac{1}{7}T_p$--; line 36, "44/7$T_p$" should read --4$\frac{4}{7}T_p$--; line 44, "44/7$T_p$" should read --4$\frac{4}{7}T_p$--; line 47, "22/7$T_p$" should read --2$\frac{2}{7}T_p$--; line 48, "11/7$T_p$" should read --1$\frac{1}{7}T_p$--; line 59, "44/7$T_p$" should read --4$\frac{4}{7}T_p$--; line 60, "22/7$T_p$" should read --2$\frac{2}{7}T_p$--.

Signed and Sealed this

Eighth Day of November 1983

[SEAL]

Attest:

GERALD J. MOSSINGHOFF

Attesting Officer     Commissioner of Patents and Trademarks